(12) United States Patent
Krumhansl et al.

(10) Patent No.: US 7,813,224 B2
(45) Date of Patent: Oct. 12, 2010

(54) SEISMIC SOURCE/RECEIVER PROBE FOR SHALLOW SEISMIC SURVEYING

(75) Inventors: Peter Krumhansl, Amhurst, MA (US); David Whittemore, Yarmouth, MA (US)

(73) Assignees: Underground Imaging Technologies, Inc., Latham, NY (US); BBN Technologies Corporation, Cambridge, MA (US)

(*) Notice: Subject to any disclaimer, the term of this patent is extended or adjusted under 35 U.S.C. 154(b) by 621 days.

(21) Appl. No.: 11/728,726

(22) Filed: Mar. 27, 2007

(65) Prior Publication Data

US 2007/0235250 A1 Oct. 11, 2007

Related U.S. Application Data

(60) Provisional application No. 60/789,698, filed on Apr. 6, 2006.

(51) Int. Cl.
*G01V 1/143* (2006.01)

(52) U.S. Cl. ............ 367/189; 367/38; 181/121

(58) Field of Classification Search ............ 367/37, 367/38, 189, 190; 181/121
See application file for complete search history.

(56) References Cited

U.S. PATENT DOCUMENTS

| | | | | |
|---|---|---|---|---|
| 3,283,846 A | * | 11/1966 | Lindall et al. | 181/114 |
| 4,222,454 A | * | 9/1980 | Airhart | 181/117 |
| 4,244,437 A | * | 1/1981 | Fulkerson | 181/114 |
| 4,770,269 A | * | 9/1988 | Woodrow | 181/121 |
| 4,921,067 A | * | 5/1990 | Fulkerson et al. | 181/121 |
| 5,404,755 A | * | 4/1995 | Olson et al. | 73/639 |
| 5,483,026 A | * | 1/1996 | Hasbrouck et al. | 181/121 |
| 5,553,407 A | | 9/1996 | Stump | |
| 5,614,670 A | | 3/1997 | Nazarian et al. | |
| 6,435,286 B1 | | 8/2002 | Stump et al. | |
| 6,484,818 B2 | | 11/2002 | Alft et al. | |
| 6,488,105 B1 | * | 12/2002 | Wilcox | 175/298 |
| 6,532,190 B2 | | 3/2003 | Bachrach | |
| 6,667,709 B1 | | 12/2003 | Hansen et al. | |
| 6,701,647 B2 | | 3/2004 | Stump | |
| 6,719,069 B2 | | 4/2004 | Alft et al. | |
| 6,755,263 B2 | | 6/2004 | Alft et al. | |
| 6,766,253 B2 | | 7/2004 | Burns et al. | |
| 6,886,644 B2 | | 5/2005 | Stump et al. | |
| 6,980,482 B2 | | 12/2005 | Faichney et al. | |
| 7,085,196 B2 | | 8/2006 | Nemeth | |
| 7,143,844 B2 | | 12/2006 | Alft et al. | |
| 7,182,151 B2 | | 2/2007 | Stump et al. | |

(Continued)

OTHER PUBLICATIONS

Bell, et al. "Novel Acoustic Technique for UXO Discrimination." Rutgers University, Jun. 30, 2001.*

(Continued)

*Primary Examiner*—Scott A Hughes
(74) *Attorney, Agent, or Firm*—Hollingsworth & Funk, LLC (57) ABSTRACT

Systems and methods are implemented for evaluating underground structures and objects, particularly relatively shallow underground structures and objects, using a seismic or acoustic source signal and a resulting seismic or acoustic wave. A discrete or unitary apparatus incorporates both a seismic source transducer and a receiver transducer within a common housing or frame. A unitary seismic probe includes a ground engaging member and a seismic source mechanically coupled to the ground engaging member. The probe further includes a sensor assembly mechanically coupled to the ground engaging member and configured to sense ground vibrations resulting from an impact to the ground engaging member by the seismic source.

21 Claims, 8 Drawing Sheets

U.S. PATENT DOCUMENTS

| | | | |
|---|---|---|---|
| 7,218,244 | B2 | 5/2007 | Jin et al. |
| 7,364,008 | B2* | 4/2008 | Rau .......................... 181/121 |
| 2007/0046289 | A1* | 3/2007 | Troxler ...................... 324/334 |
| 2008/0079723 | A1 | 4/2008 | Hanson et al. |

OTHER PUBLICATIONS

M. van der Veen, R. Spitzer, A.G. Green and P. Wild, Design and application of a towed land-streamer system for cost-effective 2-D and pseudo-3-D shallow seismic data acquisition, Geophysics, vol. 66, No. 2, (Mar.-Apr. 2001), p. 482-500.

G.S. Baker, D.W. Steeples, C. Schmeissner and K.T. Spikes, Source-Dependent Frequency Content of Ultrashallow Seismic Reflection Data, Bulletin of the Seismological Society of America, 90, 2, p. 494-499, Apr. 2000.

U.S. Appl. No. 11/804,217, filed May 16, 2007, Jones et al.

Geomedia Research & Development (GRD), Portable Seismic Properties Analyzer, PSPA & SPA Manager Manual, Version 2.1e, 2007, 85 pages.

Geomedia Research & Development (GRD), Portable Seismic Properties Analyzer for Nondestructive Testing, www.Geomedia.US, 3 pages.

Underground Imaging Technologies (UIT), Concrete Integrity Investigation using Seismic, www..uit-systems.com., 1 page.

USDOT Spectral Analysis of Surface Waves (SASW) and Ultra Sonic Surface Wave (USW) Methods, http://www. cflhd.gov/agm/engApplications/Pavements/413SpecAnalySurfWaveandUltrSo, printed from the internet Jan. 26, 2010, 5 pages.

Huston et al, Bridge Deck condition Assessment with Electromagnetic, Acoustic and Automated Methods, for Proceedings of the $6^{th}$ International Workshop on Structural Health Monitoring 2007, 10 pages.

USDOT Portable Seismic Property Analyzer, Identification of Asphalt Pavement Layers, Publication No. FHWA-CFL/TD-09-002, Jul. 2009, 10 pages.

* cited by examiner

SEISMIC SOURCE/RECEIVER PROBE FOR SHALLOW SEISMIC SURVEYING

RELATED APPLICATIONS

This application claims the benefit of Provisional Patent Application Ser. No. 60/789,698 filed on Apr. 6, 2006, to which priority is claimed pursuant to 35 U.S.C. §119(e) and which is hereby incorporated herein by reference.

FIELD OF THE INVENTION

The present invention relates generally to equipment and methods used for surveying underground features. More specifically, the present invention relates to an apparatus capable of both generating seismic signals and of receiving and measuring a resulting seismic or acoustic wave. The present invention further relates to a method of exploiting such an approach to detect and/or measure relatively shallow features, such as buried utilities.

BACKGROUND

The Seismic method is a known technique of performing below-ground surveys. It involves the generation of a pressure or sound wave (p-wave), shear wave (s-wave), or other types of waves and transmission of same through the ground being surveyed. These waves cause relative motion of the ground, including the soil, rock or stones, and any water.

The Seismic wavefield can be received, or detected, at the surface and measured to determine information about the sub-surface. Various techniques can be used to improve the reliability of the resulting measurement, including the use of multiple surface sensors for a single seismic source. The signal and data collection can also be repeated to improve the accuracy of the measurement, such as by improving the signal-to-noise ratio.

Such techniques are known to be useful for exploration of the underground ranging in depth from about 50 to 500 meters, or more. To reach these depths, the signal sources used must be capable of transmitting significant energy into the ground. Conventional sources include explosives, large vibrating trucks, and large weight drops. A typical earth tamper, for example, generates an impact force of about 3,000 lbs. Typical vibrators generate a peak force ranging from about 11,000 lbs to about 33,000 lbs.

SUMMARY

The present invention is directed to systems and methods for evaluating underground structures and objects. More particularly, the present invention is directed to evaluating relatively shallow underground structures and objects (metallic or non-metallic) using a seismic source signal and a resulting seismic or acoustic wave.

In general terms, embodiments of the present invention are directed to a seismic source transducer and a receiver transducer configured to detect buried objects, such as utilities, to a maximum depth of about 15 ft or about 3-4 m. A low energy seismic source transducer of the present invention produces a probe wave of a type and wavelength appropriate for imaging underground objects to a maximum depth of about 15 ft (~3-4 m) by a receiver transducer. A seismic evaluation methodology of the present invention may involve use of a pressure or sound wave (p-wave), shear wave (s-wave), or other type of wave (e.g., surface wave) that propagates through the ground being evaluated.

Although the embodiments described herein include both a seismic source and a seismic receiver, it is understood that each represents an individual inventive component that may be used with a source/receiver of a type differing from those described herein, with the understanding that such source/receiver component is configured for shallow seismic evaluation (i.e., depths typically less than 15 ft and often about 10 ft or less).

Embodiments of the present invention are directed to a seismic probe that includes a seismic source assembly mechanically coupled to a ground engaging member. The seismic probe also includes a seismic receiver assembly mechanically coupled to a ground engaging member other than that coupled to the seismic source assembly, although a common ground engaging member may be used in various configurations. The seismic receiver assembly is configured to sense ground vibrations resulting from an impact generated by the seismic source assembly for evaluating buried objects to a maximum depth of about 15 feet. The seismic source assembly is preferably configured to produce a probe wave that facilitates sensing of ground vibrations of a type and wavelength appropriate for imaging underground objects to a maximum depth of about 15 ft by the seismic receiver assembly.

Embodiments of the present invention are further directed to a discrete or unitary apparatus that incorporates both a seismic source transducer and a receiver transducer within a common housing or frame. Although such a discrete or unitary apparatus offers several advantages over a non-unitary implementation, it is understood that the seismic probing and detection methodology described herein may be implemented in systems that employ a separate seismic source and a separate seismic receiver for evaluating shallow buried objects.

In accordance with embodiments of the present invention, a unitary seismic probe includes a ground engaging member and a seismic source mechanically coupled to the ground engaging member. The probe further includes a sensor assembly mechanically coupled to the ground engaging member and configured to sense ground vibrations resulting from an impact to the ground engaging member by the seismic source.

The seismic source may be implemented to include an anvil configured to be struck by a source of energy and transmit energy resulting from an anvil strike through the ground engaging member. The energy source may be implemented to include an activator configured to strike the anvil to generate a seismic or acoustic wave. The energy source may include a spring biased plunger, positioned away from the anvil in a first state, and configured to cooperate with a solenoid configured to propel the plunger towards the anvil when energized. The energy source may include a solenoid coupled to a capacitor.

In applications involving relatively soft soil, the ground engagement member preferably includes a wedge, which penetrates the soft soil and compresses the soil to stiffen it. In applications involving relatively hard soil or surfaces, such as concrete, the ground engagement member typically includes a substantially flat portion arranged to contact the ground.

The sensor assembly is preferably configured to sense ground vibrations of a type and wavelength appropriate for imaging underground objects to a maximum depth of about 15 feet. In one configuration, the sensor assembly includes an accelerometer. In another configuration, the sensor assembly includes a velocity sensor. In a further configuration, the sensor assembly includes a geophone.

The sensor assembly may include a generally cylindrical body that has a first end coupled to the ground engaging member and a second end having a generally flat surface for supporting an anvil and an aperture for supporting a sensor configured to sense ground vibrations resulting from the impact to the ground engaging member by the seismic source. The sensor assembly is mounted to the force generator with a suitable suspension. This suspension allows the ground contacting member to move with the earth's vibration when receiving seismic signals. The suspension allows the ground engaging member to move freely when force is applied to the anvil.

In accordance with further embodiments of the present invention, a seismic source/receiver probe array includes a frame comprising ground supports configured to support the sensor array as it is pulled across the ground. The array further includes a plurality of discrete probes, each comprising a ground engaging member, a seismic source mechanically coupled to the ground engaging member, and a sensor assembly mechanically coupled to the ground engaging member and configured to sense ground vibrations resulting from an impact to the ground engaging member by the seismic source. The array also includes a cross member configured to support pivoting mount arms for each probe so that the discrete probes are maintained in substantially fixed relative locations while allowing the probes to individually contact and engage the ground with a consistent force. The mount arms may be secured to the frame such that they are isolated from one another both electrically and for mechanical vibrations.

In accordance with other embodiments of the present invention, methods of probing the ground involve contacting the ground with a ground engaging member, generating a seismic or acoustic probe wave, and transmitting the probe wave into the ground using the ground engaging member. Such methods also involve sensing, using the ground engaging member, ground vibrations resulting from the transmitted probe wave.

The probing method preferably facilitates imaging of underground objects to a maximum depth of about 15. For example, probe wave generation and ground vibration sensing preferably facilitate sensing of ground vibrations of a type and wavelength appropriate for imaging underground objects to a maximum depth of about 15 feet.

Generating the seismic or acoustic probe wave may involve generating an impact force of no greater than about 50-500 lbs, and preferably no greater than about 50-250 lbs, and more preferably no greater than about 50-150 lbs. For example, generating the seismic or acoustic probe wave may involve generating an impact force of no greater than about 120 lbs peak.

The generated probe wave preferably provides a response bandwidth to about 3 kHz for depths up to about 15 feet (~3-4 meters). The probing method may further involve self-seating the ground engaging member using the probe wave transmitted to the ground engaging member.

According to other embodiments, methods of the present invention may involve contacting the ground with a plurality of ground engaging members, generating, for each ground engaging member, a seismic or acoustic probe wave, transmitting the probe waves into the ground using the plurality of ground engaging members, and sensing, using each of the ground engaging member, ground vibrations resulting from the transmitted probe waves. The probe waves may be transmitted into the ground using each of the ground engaging members, one at a time, while sensing ground vibrations using some or all of the other ground engaging members.

Methods of the present invention may further involve scanning a region of ground by repeating the contacting, generating, transmitting, and sensing processes at each of a plurality of ground locations. Methods may involve, for example, storing ground vibration sensing data, recording position data while scanning, and combining the ground vibration sensing data with the position data to develop a map of the scanned region.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION

In the following description of the illustrated embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Reference will now be made in detail to exemplary aspects of the present invention which are illustrated in the accompanying drawings. Wherever possible, the same reference numbers will be used throughout the drawings to refer to the same or like parts.

The present invention solves a need for a below-ground surveying system and method for evaluating shallow features using seismic or acoustic waves. Conventional techniques have not been practical for shallow applications because known seismic sources are cumbersome, generally do not generate seismic energy of wavelengths appropriate for imaging small shallow targets, severely deform the near surface material degrading coupling required for shallow imaging, and are not practical for performing surveys of large surface areas with very high resolution.

As was discussed in the Background, conventional seismic sources include explosives, large vibrating trucks, and large weight drops that generate an impact force ranging from about 11,000 lbs to about 33,000 lbs. Such sources do not generate waves having a sufficiently high frequency (or sufficiently short wavelength) and short duration needed for evaluating shallow features for maximum depths of about 15 feet (~3-4 meters).

Embodiments of the present invention are directed to seismic sources and receivers configured to detect buried objects to a maximum depth of about 15 ft, and typically to a maximum depth of about 10 ft. Low energy seismic sources of the present invention preferably produce a probe wave of a type and wavelength that facilitates imaging of underground objects to a maximum depth of about 15 ft (~3-4 meters) by a seismic receiver. A seismic evaluation methodology of the present invention may involve use of a pressure or sound wave (p-wave), shear wave (s-wave), or other type of wave (e.g., surface wave) that propagates through the ground being evaluated. It is understood that the term "seismic wave" as used herein is intended to cover both seismic and acoustic waves.

A seismic probe of the present invention advantageously incorporates both a seismic source and a receiver within a common housing or frame. For example, a seismic probe of the present invention is preferably implemented as a discrete or unitary apparatus that incorporates a seismic source transducer and a receiver transducer. Incorporating both the source and receiver components of the seismic probe within a common housing or frame provides for a number of advantages, including reducing/minimizing total ground contact points, reducing sensor count (e.g., by 50%) in multi-element arrays required for shallow seismic imaging, minimizing array planting times, and enhancing control of the geometry of the seismic sources and receivers.

In one embodiment, a seismic probe of the present invention combines a solenoid seismic source with a high frequency moving coil geophone, accelerometer sensor, or velocity sensor in a lightweight sensor head with appropriate suspension/isolation. A seismic probe that combines a seismic source and a seismic receiver in one compact package can be planted in ground or arranged to contact pavement.

According to various embodiments, the seismic probe incorporates a wedge point that is used to improve both receiver coupling and seismic source coupling. The wedge point, useful in soil or other loose geology, increases high frequency coupling of transducers for detecting seismic waves in soils for vertical and horizontal ground motion. A wedge body that includes a blade point penetrates soft surface soil, and wedges and stiffens contact with soil. The blade preferably has a surface area larger than that of standard spikes. The wedge shape and vertical force creates pressure on soil particles which causes the soil to be stiffened at the contact. This raises the fundamental high frequency coupling resonance. The raising of this high frequency resonance is critical for high frequency signal transduction and phase coherence between array elements.

The wedge body and blade also provides for self-seating of the seismic probe in relatively soft and/or variable soil. It has been found that the initial impacts to the wedge body via the seismic source incrementally (with each impact) forces the wedge blade into the soil. After a few impacts (typically less than 5-10), the wedge body/blade is self-seated (typically to a depth ranging from about 5 cm to about 10 cm) making optimal contact with the soil. This self-seating operation occurs using impacts associated with normal underground probing, thus obviating a separate (and typically different) probe seating operation.

The self-seating aspect of the seismic probe is due in part to the relatively low impact force generated by the seismic source. Unlike large conventional seismic imaging systems, such as those described above, that generate impact forces on the order of thousandth or tens of thousands of pounds, a seismic probe of the present invention generates a relatively low impact force (e.g., less than 500 lbs) that is appropriate for evaluating shallow features, such as buried utilities. A typical impact force produced by a seismic probe of the present invention ranges from about 50 lbs to about 500 lbs, for example. An impact force of about 120 lbs, for example, is sufficient to seat the probe's wedge blade about 3 inches into sand, for example.

It is understood that a wedge shaped sensor head is appropriate for relatively soft or loose soil. For hard surfaces, such as concrete or asphalt, the sensor head is typically flat or has a shape appropriate for the particular surface characteristics. The same measurement technique is carried out for non-wedge shaped sensor heads.

An exemplary seismic source for the seismic probe includes a solenoid linear motor with armature, spring return, and ground contacting head, preferably having a wedge shape. Energy provided by a battery is used to store charge in large capacitor. A switching system is used to dump the stored charge from the capacitor to the solenoid. Current causes the armature to accelerate and impact the ground contacting head. The capacitor size is appropriately selected to maintain force after impact to eliminate bouncing. Such a seismic source provides a controlled repeatable impulsive source. Advantageously, such an apparatus is typically inexpensive (e.g., ~$35 for the solenoid and ~$90 for the accelerometer), simple, and reliable, and can be implemented to make repeated impacts for stacking.

Another aspect of the present invention provides for array mounting of multiple transducers for high frequency transduction of seismic vibrations. For seismic imaging, multiple probes must be simultaneously coupled to the ground with accurate geometric positioning. A properly designed suspension between the array frame and probe head facilitates precision placement of the probe heads, and allows application of force to the probe head while minimizing dynamic mass. Proper suspension also serves to isolate vibration from one probe to another, thereby minimizing crosstalk interference between array channels.

Seismic probes implemented in accordance with the present invention have demonstrated a very broadband response (e.g., to nearly 3 kHz) and a near-perfect impulse response centered in a 1 kHz band, a compact time response, and highly repeatable performance, which are attributes particularly well-suited for evaluating shallow features (e.g., ≦3 m, such as buried utilities). Seismic probes of the present invention have demonstrated sufficient source levels and a receiver noise floor for detecting such shallow features (e.g., signal at a minimum of 40 dB above instrumentation noise floor across required spectrum; measure signal levels at 40 dB above ambient and system noise floor). These and other advantageous features of the present invention will now be described in greater detail and in reference to the accompanying drawings.

Figure 1:
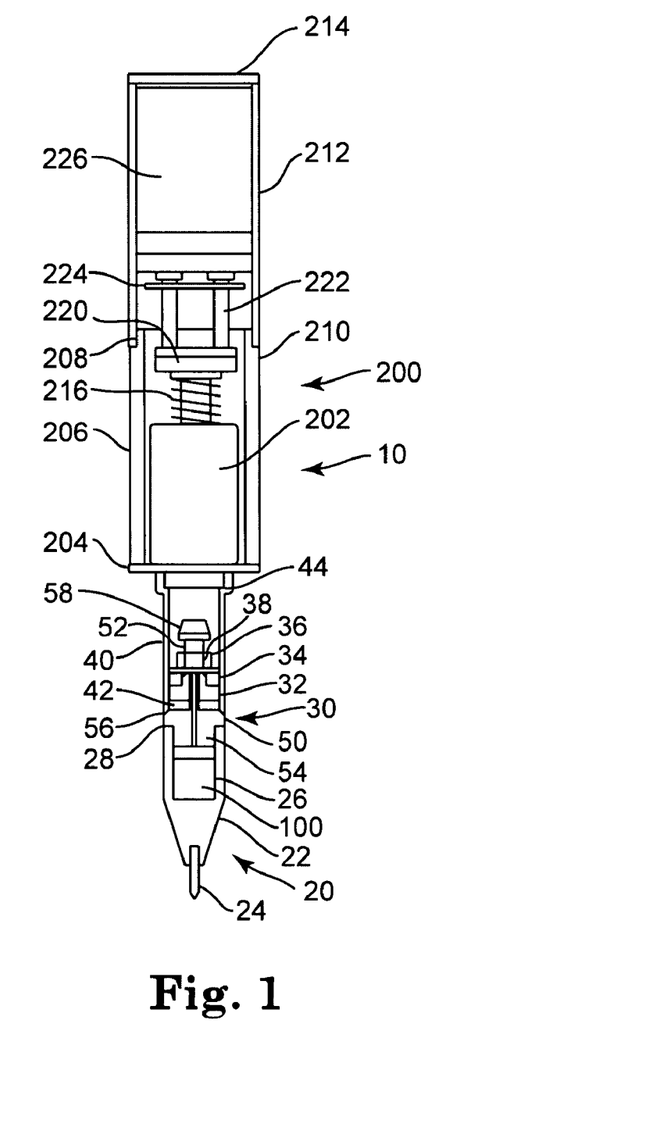
FIG. 1 is a cross-section of a unitary seismic source/receiver probe of the present invention.

FIG. 1 illustrates a seismic probe 10 of the present invention that includes a ground contacting structure 20, a sensor 100, and an activator 200. One aspect of the present invention lies in the combination of these elements into a unitary or self-contained assembly. A second aspect of the present invention is the specific configuration illustrated herein as the preferred embodiment, while other configurations may be possible.

The embodiment of the probe 10 shown in FIG. 1 includes a ground contacting structure 20 that incorporates a wedge 22 with a replaceable blade 24. Since the blade 24 is replaceable, the shape of the blade 24 can be modified if required for differing ground conditions. The wedge 22 further includes an aperture 26 and a shoulder 28.

The probe 10 further includes an actuator support structure 30 that incorporates a spindle 50, with a threaded shank 52, and a spindle housing 40 with an internal shoulder 42. The spindle housing 40 is fixed to the spindle 50 with a bottom isolator bushing 32 and a top isolator bushing 34 that sandwiches the internal shoulder 42 when a washer 36 and nut 38 are tightened onto the threaded shank 52.

The actuator support structure 30 is attached to the ground contacting structure 20 by engaging externally threaded section 54 with an internally threaded section of the aperture 26 of the wedge 22, to the point that a shoulder 56 engages the shoulder 28 of the wedge 22. Anvil 58 includes an internal thread and attaches to the threaded shank 52 of the spindle 50.

Spindle housing 40 includes an internally threaded aperture 44 that is utilized to connect an activator 200 to the ground contacting structure 20. The internal threads in aperture 44 engage external threads of a solenoid 202, with a lower plate 204 being trapped between the solenoid 202 and the spindle housing 40. Lower plate 204 supports a solenoid housing 206 which provides protection for the solenoid, sealing it from dust and water, for instance. The solenoid housing 206 further includes an externally threaded end 208 that is configured to couple with an internally threaded aperture 210 of a capacitor housing 212. Capacitor housing 212 is a generally cylindrical shape with a top cap 214, situated on the side opposite the threaded aperture 210. When assembled, the lower plate 204, solenoid housing 206, capacitor housing 212, and top cap 24 are all joined forming a generally sealed cylindrical tube.

This tubular structure, effectively a solenoid enclosure, contains and protects the solenoid 202, a spring 216, a hammer 218, a stop structure 220, stop supports 222, a circuit board 224, and a capacitor 226, which is attached to one end of the ground contacting structure 20. Sensor 100 is attached to the ground contacting structure 20 at an opposite end. A suitable solenoid 202 for this application is identified as Guardian Electric Model TP12X19 Solenoid, rated at 24 V, 100 oz continuous. Force, and 0.75 in. in travel (stroke). A suitable sensor 100 for this application is an accelerometer, such as Oceana Sensors TR0APN Accelerometer, which has a bandwidth of 2.5 kHz. Another suitable sensor 100 is a high frequency moving coil geophone.

Figure 2:
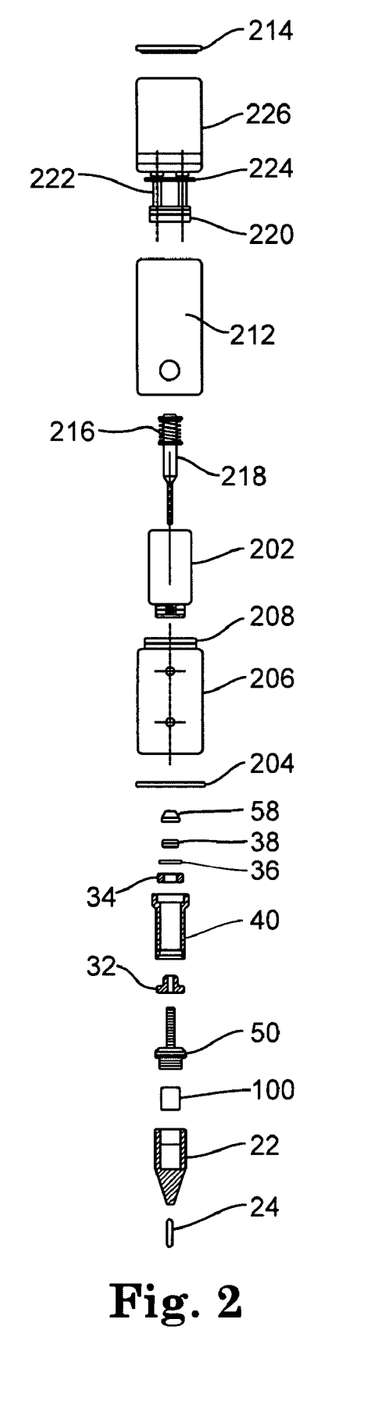
FIG. 2 is an exploded drawing of the seismic source/receiver probe shown in FIG. 1.

FIG. 2 illustrates the components of FIG. 1 in an exploded view, further illustrating the physical configuration of the probe assembly 10. As expressed earlier, this configuration is one of many that may be utilized.

The probe assembly 10, thus described, functions to both generate a pressure wave into the ground, and to permit sensing of the ground for resulting wave motion. The process of generating a pressure wave using the probe assembly 10 begins with positioning the probe 10 so that it is in contact with the ground, such that the blade 24 and/or wedge 22 is in contact with the ground. With the solenoid 202 de-energized, the spring 216 lifts the hammer 218 up, as illustrated in FIG. 1. An electrical charge is applied to the capacitor 226, to store electrical energy. The pulse circuit board 224 includes a switch that can separate the capacitor and the solenoid. To generate a pressure wave, once the capacitor is charged, the pulse circuit board 224 receives a signal to close the circuit between the capacitor 226 and the solenoid 202. Once the circuit is thus closed, the solenoid 202 is energized, and the resulting magnetic field reacts with the hammer 218, forcing it down and compressing spring 216, until the end of the hammer 218 strikes the anvil 58.

The impact force caused when the hammer 218 strikes the anvil 58 is transferred through the spindle 50 to the wedge 22 through the contact between the shoulder 56 and the shoulder 28. The force is transferred into the ground. The amount of force generated by this apparatus is preferably related to several controllable factors, including the mass of the various components, the size of the capacitor and solenoid, and the control of the time duration of the connection of the solenoid to the capacitor.

The probe 10 can be used to measure the resulting vibrations induced in the soil, by monitoring the sensor 100, located in the wedge 22. Probe 10 is configured and operated in a manner to minimize the possibility of damaging the sensor 100, when subjected to impact loads generated during pressure wave generation, such as by positioning the sensor 100 in the wedge 22, and by controlling the capacitor 226 and solenoid 202 in a known and repeatable manner.

Figure 3:
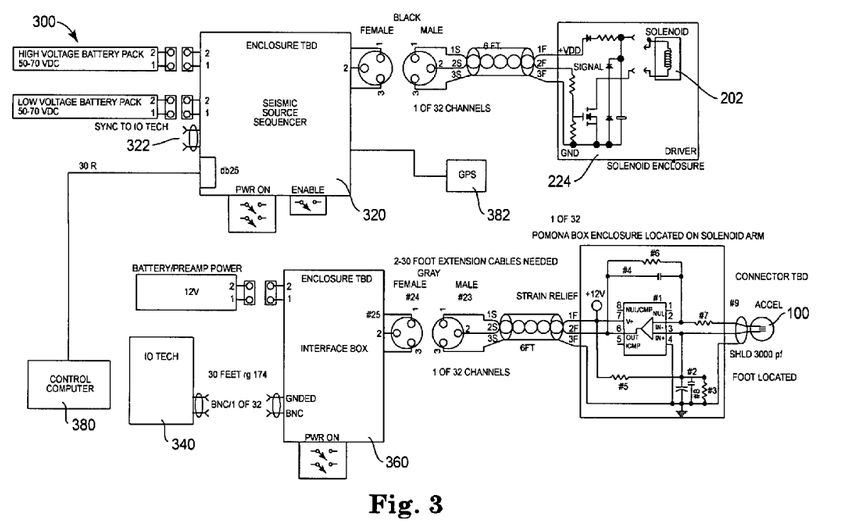
FIG. 3 is an electrical schematic of a system incorporating the seismic source/receiver probe of FIG. 1.

The consistency of operation is enhanced by the fact that the actuator system is electrical, and can be controlled with electronic systems. The control system of the present embodiment is illustrated in FIG. 3. This configuration is being disclosed as a preferred embodiment, but is not meant to be limiting, as several various configurations may be implemented to provide the required functionality. In addition, the electrical system is being described at a schematic level, excluding details about the exact electrical connections as many different types of connections are possible.

FIG. 3 illustrates the overall control system 300, whose main components include a main control computer 380, a seismic source sequencer 320, a sensor interface 360, and a data acquisition system, e.g., IOtech 340. The control computer 380 signals through a serial connection to the source sequencer 320 to trigger one or more sources. The source sequencer 320 then sends precisely timed control signals to the circuit in the solenoid enclosure 224 in the seismic probe. One of 32 connections are shown, each including a solenoid enclosure with a pulse circuit board 224 and solenoid 202. This activates the source and generates the seismic wave in the ground.

The control computer 380 concurrently triggers the IOtech module 340, which starts digitizing sensor data from all sensors in the array. The sensors are connected to the data acquisition system 340 through interface box 360 which supplies power to suitable signal conditioning and amplification circuitry. The control computer 380 is programmed to automate the process, controlling all functions providing efficient array operation, uniform data quality, and storage of data to disk.

The main control computer 380 includes additional input/output capability as necessary to couple to a Global Positioning System 382. This electronic hardware, including the probes of the present invention, is preferably configured onto a common chassis of the present invention. The system further includes power supplies as required, such as high voltage batteries and low voltage batteries.

Figure 4:
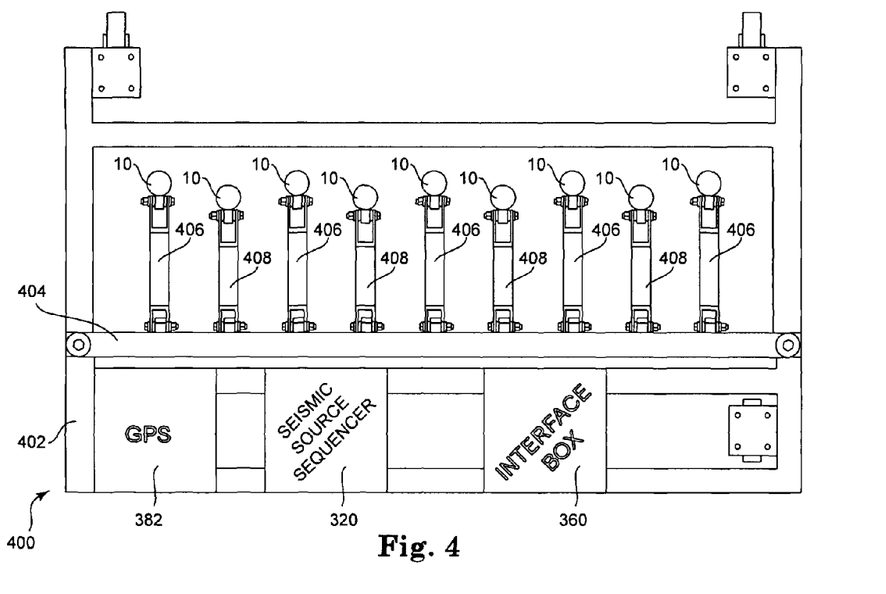
FIG. 4 is a top view of an apparatus that incorporates an array of seismic source/receiver probes of FIG. 1, and circuitry shown in the electrical schematic of FIG. 3, into a self-contained apparatus.

FIG. 4 illustrates an embodiment of a cart 400 that includes a frame 402 onto which the source sequencer 320, the interface box 360, and a GPS sensor 382 are mounted. The cart frame 402 additionally supports a probe support frame 404 which includes individual suspension mechanisms 406 or 408, one for each individual probe 10.

Figure 5:
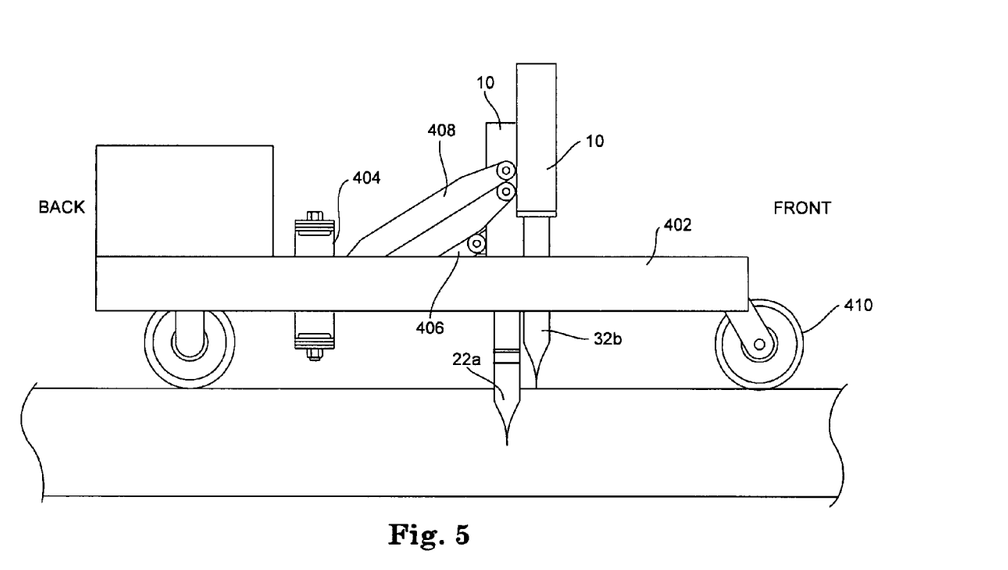
FIG. 5 is a side view of the apparatus of FIG. 4.

The suspension mechanisms 406, 408 are illustrated in a side view in FIG. 5, including a 4-bar link with parallel arms. This arrangement keeps the probes 10 perpendicular to the frame as they are raised and lowered. The arms may be automatically lowered and raised with a suitable mechanism. FIG. 5 illustrates one of the wedges 22a lowered into contact with the ground, as is ideal for preparing to sample the ground, and one wedge 22b raised to a transport position.

Figure 6:
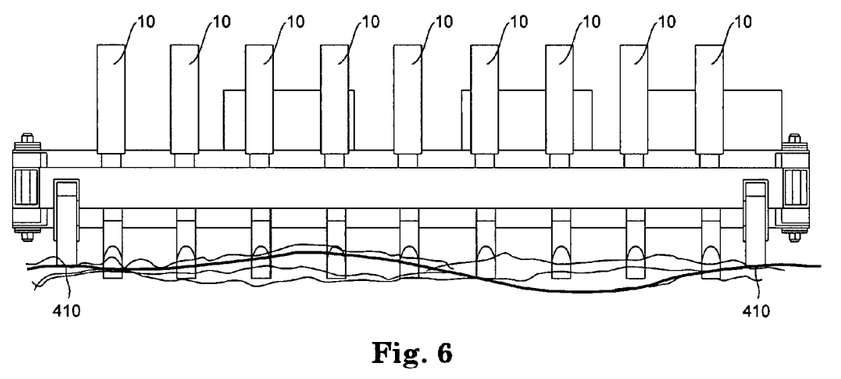
FIG. 6 is a front view of the apparatus of FIG. 4.
Figure 7:
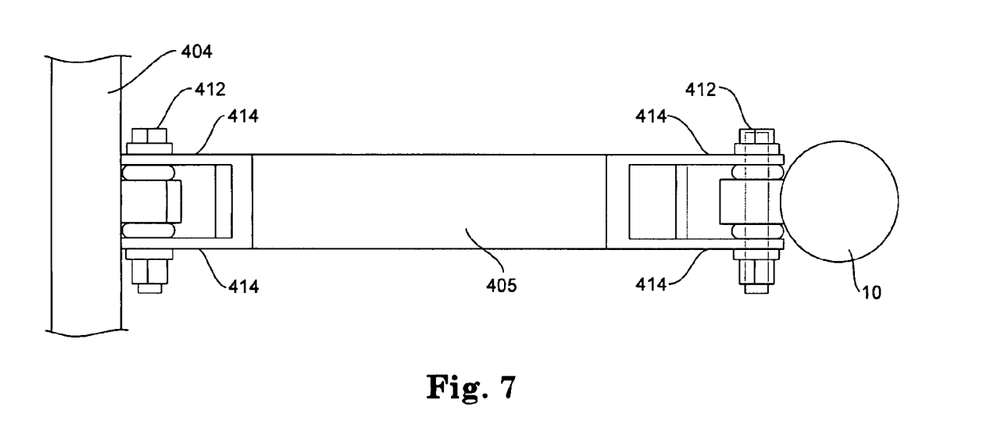
FIG. 7 illustrates the mounting arrangement of the seismic source/receiver probe, in particular the manner in which the individual sensors are mounted to a supporting cross member.
Figure 8:
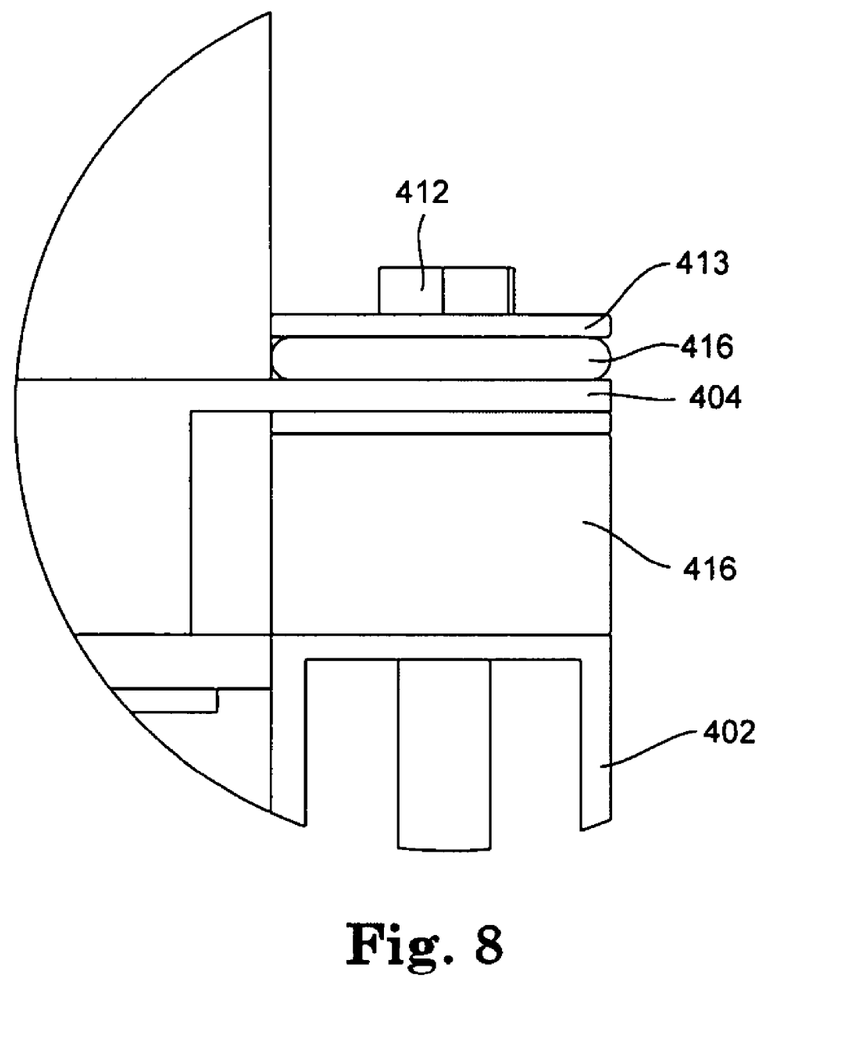
FIG. 8 illustrates the frame isolation for the supporting cross member shown in FIG. 7.

FIG. 6 illustrates a front view of the cart showing ground support wheels 410, and each of the probes 10 engaged with the ground, to a level allowed by the maximum travel of the coupling arms 406 and 408, as is possible with the individual suspensions for each probe. These individual suspensions allow sensor coupling on irregular surfaces. This suspension is illustrated in greater detail in FIG. 7, illustrating a top view of an individual support arm 405. The assembly of FIG. 7 includes a probe 10 and cross member 404 both configured with a mounting tab to accept bolts 412 (with washers 413) and rubber isolators 414 to isolate individual probes 10 from the frame and from each other. The cross frame 404 is isolated from the frame 402 with rubber isolators 416, as illustrated in FIG. 8.

Activating a particular probe to produce a pressure wave, as described previously, and using the same probe to measure the time of actual solenoid impact and so provide a 'zero time' is the preferred method of operation. The probes are configured to be specifically utilized in a sensor array, as shown in FIGS. 4, 5 and 6. A method of using such a sensor array preferably involves some form of sequential activation of one or more individual probes, and the associated monitoring of some or all other probes.

The overall assembly 400 may be positioned in an area of interest, and the probes lowered into contact with the ground. In some cases, the probes may simply be touching the ground, such as on concrete surfaces, and in other cases the probes may be pushed into soft ground. According to one technique, the actual data collection process may start by first activating one probe, while monitoring all others for the resulting seismic wave field. The assessment continues by sequentially activating each, or some selection of, the probes, while monitoring others. There are several advantages related to the present invention, that improve the reliability of the data thus generated including:

1) the activation of each probe, as a transmitter improves ground engagement, and thus the accuracy/sensitivity of that probe when used as a sensor;

2) there is reciprocal data cross correlation resulting from the ability to transmit a signal from a first point while receiving a resulting signal at a second point, and then reversing this processes, by transmitting a signal from the exact same second point while receiving the resulting signal at the exact same first point. This is significant for checking for variations in probe coupling and data quality, which is critical for high frequency seismic detection.

Many control techniques can be employed with an apparatus of the present invention, to improve the reliability of the resulting data. In each event, when the assembly is being used to generate mapping data, survey data of the subsoil may be concurrently combined with data acquired from a GPS sensor, so that the data includes spatial location data useful in later generating mapping data.

Figure 9A:
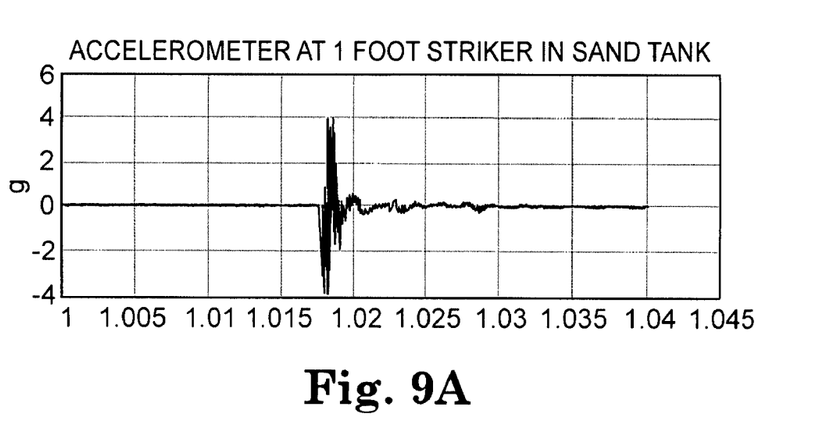
FIG. 9A is a graph of the time history of ground vibration of an impact in sand produced by the seismic source of a seismic probe of the present invention.
Figure 9B:
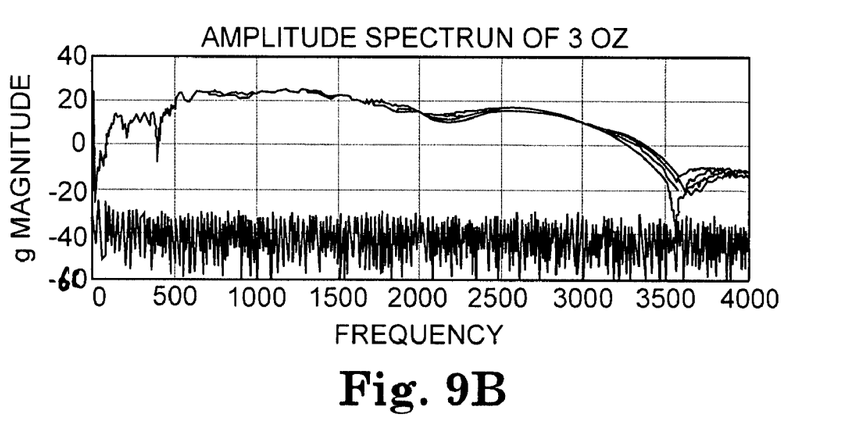
FIG. 9B is a graph of the frequency spectrum to the impact depicted in FIG. 9A by the seismic receiver of a seismic probe of the present invention.

FIGS. 9A and 9B demonstrate the efficacy of a seismic probe implemented in accordance with the present invention. The seismic probe that produced the graphical data in FIGS. 9A and 9B was pushed into sand in a sand tank, with the seismic source/receiver probe located at a depth of about 1 foot. The seismic source produced an impact force of about 120 lbs. FIG. 9A shows the time history of ground vibration of the impact produced by the seismic source. FIG. 9B shows the frequency spectrum of the seismic signal produced by the seismic receiver in response to the probe's impact. FIG. 9B shows a very broadband response to nearly 3 kHz.

It will, of course, be understood that various modifications and additions can be made to the preferred embodiments discussed hereinabove without departing from the scope of the present invention. Accordingly, the scope of the present invention should not be limited by the particular embodiments described above, but should be defined only by the claims set forth below and equivalents thereof.

What is claimed is:

1. A seismic sensor array, comprising;
   a frame comprising ground supports configured to support the sensor array as it is pulled across the ground;
   a plurality of discrete probes, each comprising;
      a ground engaging member;
      a seismic source mechanically coupled to the ground engaging member; and
      a sensor assembly mechanically coupled to the ground engaging member and configured to sense ground vibrations resulting from an impact to the ground engaging member by the seismic source; and
   a cross member configured to support pivoting mount arms for each probe so that the discrete probes are maintained in substantially fixed relative locations while allowing the probes to individually contact and engage the ground with a consistent force.

2. The sensor array of claim 1, wherein the mount arms are secured to the frame such that they are isolated from one another both mechanically and electrically.

3. The sensor array of claim 1, wherein the seismic source comprises a solenoid coupled to a capacitor.

4. The sensor array of claim 1, wherein the seismic source comprises an anvil configured to be struck by a source of energy and transmit energy resulting from an anvil strike through the ground engaging member.

5. The sensor array of claim 4, wherein the energy source comprises an activator configured to strike the anvil to generate a seismic or acoustic wave.

6. The sensor array of claim 4, wherein the energy source comprises a spring biased plunger, positioned away from the anvil in a first state, and configured to cooperate with a solenoid configured to propel the plunger towards the anvil when energized.

7. The sensor array of claim 1, wherein the ground engagement member comprises a wedge.

8. The sensor array of claim 1, wherein the ground engagement member comprises a substantially flat portion arranged to contact the ground.

9. The sensor array of claim 1, wherein the sensor assembly is configured to sense ground vibrations of a type and wavelength appropriate for imaging underground objects to a maximum depth of about 15 feet.

10. The sensor array of claim 1, wherein the sensor assembly comprises an accelerometer.

11. The sensor array of claim 1, wherein the sensor assembly comprises a velocity sensor or a geophone.

12. The sensor array of claim 1, wherein the sensor assembly further comprises:
   a generally cylindrical body;
   a first end coupled to the ground engaging member; and
   a second end comprising:
      a generally flat surface for supporting an anvil; and an aperture for supporting a sensor configured to sense ground vibrations resulting from the impact to the ground engaging member by the seismic source.

13. A method of probing the ground, comprising:
moving a frame that supports a plurality of discrete probes across the ground, the frame coupled to a cross member configured to support pivoting mount arms for each probe, each of the probes comprising:
a ground engaging member;
a seismic source mechanically coupled to the ground engaging member; and
a sensor assembly mechanically coupled to the ground engaging member and configured to sense ground vibrations resulting from an impact to the ground engaging member by the seismic source;
maintaining, using the pivoting mount arms, the probes in substantially fixed relative locations while allowing the probes to individually engage the ground with a consistent force;
contacting the ground with the ground engaging members;
generating a seismic or acoustic probe wave using the seismic sources;
transmitting the probe wave into the ground using the respective ground engaging members; and
sensing, using the respective ground engaging members, ground vibrations resulting from the transmitted probe wave.

14. The method of claim 13, wherein the probing method facilitates imaging of underground objects to a maximum depth of about 15 feet.

15. The method of claim 13, wherein the probe wave generation and ground vibration sensing facilitate sensing of ground vibrations of a type and wavelength appropriate for imaging underground objects to a maximum depth of 15 feet.

16. The method of claim 13, wherein generating the probe wave comprises generating an impact force of no greater than about 500 lbs peak.

17. The method of claim 13, wherein the generated probe wave provides a response bandwidth to about 3 kHz for depths up to about 15 feet.

18. The method of claim 13, further comprising self-seating the ground engaging members using the probe wave transmitted to the respective ground engaging members.

19. The method of claim 13, wherein probe waves are transmitted into the ground using each of the ground engaging members, one at a time, while sensing ground vibrations using some or all of the other ground engaging members.

20. The method of claim 13, further comprising scanning a region of ground by repeating the contacting, generating, transmitting, and sensing processes at each of a plurality of ground locations.

21. The method of claim 20, further comprising:
storing ground vibration sensing data;
recording position data while scanning; and
combining the ground vibration sensing data with the position data to develop a map of the scanned region.

* * * * *